United States Patent

[11] 3,579,007

| [72] | Inventor | John Walter<br>Evergreen Park, Ill. |
|---|---|---|
| [21] | Appl. No. | 872,606 |
| [22] | Filed | Oct. 30, 1969 |
| [45] | Patented | May 18, 1971 |
| [73] | Assignee | Sunbeam Corporation<br>Chicago, Ill. |

[54] COMMUTATOR BRUSH STRUCTURE FOR ELECTRIC MOTOR
7 Claims, 5 Drawing Figs.

[52] U.S. Cl. .................................................. 310/242,
310/43, 310/247
[51] Int. Cl. ...................................................... H02k 5/14
[50] Field of Search............................................ 310/272;
310/239, 242, 245, 247, 43, 89

[56] References Cited
UNITED STATES PATENTS

| 3,456,696 | 7/1969 | Gregory et al. | 310/239X |
| 3,525,891 | 8/1970 | Lukawich et al. | 310/239 |
| 2,798,979 | 7/1957 | Ernst | 310/239X |
| 2,683,828 | 7/1954 | Staak | 310/247 |
| 3,176,177 | 3/1965 | Huston | 310/247 |
| 3,177,388 | 4/1965 | Cook | 310/247 |
| 3,329,844 | 7/1967 | Happe | 310/247 |
| 3,436,576 | 4/1969 | Klebe | 310/247 |
| 3,474,274 | 10/1969 | Groschopp et al. | 310/242 |

*Primary Examiner*—Milton O. Hirshfield
*Assistant Examiner*—B. A. Reynolds
*Attorney*—George R. Clark

ABSTRACT: An electric motor having a supporting frame within which the commutator brushes are supported. The brushes are received in channel-shaped recesses and are retained therein by spring clips which snap into engagement with the supporting frame.

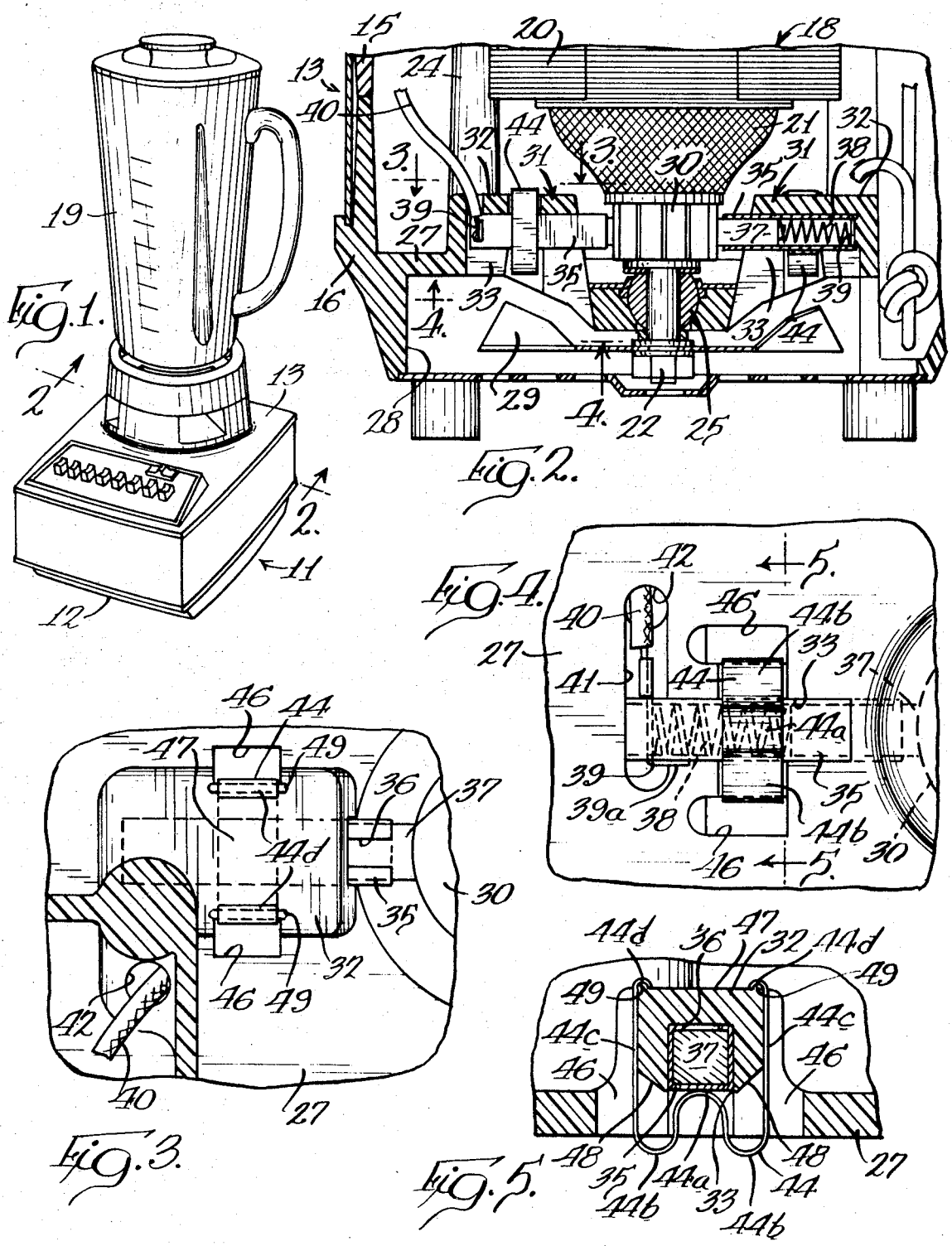
Patented May 18, 1971
3,579,007

3,579,007

COMMUTATOR BRUSH STRUCTURE FOR ELECTRIC MOTOR

BACKGROUND OF THE INVENTION

Because of the extreme price competition in the electric appliance field, there has been much research and development activity directed toward simplifying the structure of the universal-type motors which are utilized in such appliances. Since the commutator brushes in such motors have been complicated and expensive elements, there has been much activity directed toward simplifying the brush structure. One difficulty involved in cost reduction in the area of the brush structure is that, in general, the life of the motor is often determined by how long the brushes last. In addition, such aspects as brush pressure against the commutator, the composition of the brushes, and the manner in which the electrical connection of the brushes are made are important details which affect the performance of the brushes and the motor. Experience has indicated, therefore, that there are certain elements which must necessarily be retained in order to have satisfactory brush and motor life. Even with the retention of these elements, however, simplification is possible in order to reduce the piece part and assembly costs of the commutator brush structure.

SUMMARY OF THE INVENTION

The present invention is concerned with a simplified means of assembling a more or less conventional tubular brush support with respect to the other elements of the motor. A plastic frame member is utilized to support the field, the armature bearings, and the brushes. The brushes themselves are slidably received in tubular supports which are mounted in open, channel-shaped recesses in the motor frame. Simplified spring clips are provided which snap into engagement with the motor frame and bias the tubular brush supports into seated engagement in their channel-shaped recesses. This provides a commutator brush structure which is simple to manufacture and easy to assemble to the electric motor.

It is an object of the present invention to provide an improved electric motor having a simplified commutator brush structure.

It is a further object of the present invention to provide an improved commutator brush structure which may be simply and easily retained in assembled relationship to the frame of a motor.

An additional object of the present invention is to provide an improved commutator brush structure which is received in a recess in the motor frame and is retained therein by a simple spring clip.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a food blender embodying my invention;

FIG. 2 is an enlarged fragmentary sectional view taken along line 2-2 of FIG. 1;

FIG. 3 is an enlarged fragmentary sectional view taken on line 3-3 of FIG. 2;

FIG. 4 is an enlarged sectional view taken substantially along line 4-4 of FIG. 2; and FIG. 5 is a fragmentary sectional view taken along line 5-5 of FIG. 4.

DESCRIPTION OF THE PREFERRED EMBODIMENT

Referring now to the drawings in which like parts are designated by like numerals in the various views, there is shown in FIG. 1 a motor operated blender which is designated generally by reference numeral 11 and which includes a motor embodying my invention in the commutator brush structure. The blender 11 includes a base or power unit 12 which is more fully disclosed and claimed in a copending application on Motor Driven Appliance, Ser. No. 872,556, filed Oct. 30, 1969, assigned to the same assignee as the instant invention and filed concurrently herewith in the names of William M. Copeland and Worthy L. Chambers. The power unit 12 includes a housing 13 which is formed by upper and lower housing members 15 and 16, respectively. The housing members 15 and 16, which serve as a motor-supporting frame, enclose a motor 18 which is drivingly coupled to a mixing or blending assembly positioned in the bottom of a vessel 19 shown only in FIG. 1.

The motor 18 includes a laminated field 20 and an armature 21 which is supported for rotation on armature shaft 22. As is more completely disclosed in the above cited copending application, the field 20 is supported directly on the housing or frame member 16 by means of integrally formed support projections 24. In addition, the armature shaft 22 is journaled in bearings 25 which are mounted directly in the housing members 15 and 16. Only the lower armature bearing 25 is shown in FIG. 2.

The lower housing member 16 is formed with a bottom wall 27 which is provided with a downwardly facing recess 28 which accommodates the motor cooling fan 29 mounted on the lower end of the armature shaft 22. The armature 21 is formed with a commutator 30 which is positioned on the shaft 22 just above the bottom wall 27 of the housing member 16.

Positioned for engagement with the commutator 30 are the brush assemblies 31 which are supported on the wall 27 at diametrically opposed points with respect to the commutator 30. For the purpose of supporting the brush assemblies 31, the wall 27 is formed with brush enclosures 32 which extend upwardly from the general level of the bottom wall 27 as is best shown in FIGS. 3 and 5. The brush enclosures 32 are formed with channel-shaped recesses 33 which extend radially with respect to the commutator 30 and are open at their inner ends adjacent the commutator 30.

Mounted within the channel-shaped recesses 33 are tubular brush supports 35 which are generally square in cross section and are formed of a good conducting material such as brass. As is evident from FIG. 5, the tubular support 35 is not completely closed having an opening 36 between the formed edges of the member which defines the tubular support. The provision of the space or slot 36 facilitates the fabrication of the support 35. Received within the tubular brush supports 35 are the carbon brushes 37 and biasing springs 38, as is best shown in FIG. 2. Each carbon brush 37 is of a size to be slidable within the brush support 35 as a consequence of the force of the spring 38 which engages the brush 37 and biases it against the commutator 30. The outer end of the spring 38 is engaged against an electrical connector 39 which is secured to the tubular support 35 by inserting it through spaced slots in the support 35 and by bending the end over as shown at 39a in FIG. 4. The connector 39 is secured to a suitable lead 40 to connect the brush assembly 31 in circuit with the power supply.

In order to accommodate the connector 39 and the lead 40, the bottom wall 27 is formed with a transversely extending recess 41 which may be considered a part of or connected to the outer end of the channel-shaped recess 23, as is best shown in FIG. 4. A hole 42 extending completely through the wall 27 is provided for the electrical lead 40, as is best shown in FIGS. 3 or 4.

In order to retain the tubular brush supports 35 in position within the channel-shaped recesses 33, there are provided spring clips 44 which are adapted to snap into engagement with the bottom wall 27 to retain the brush assemblies 31 in position. As is best shown in FIG. 5, the retaining clip 44 is of generally W-shaped configuration having a central loop 44a, the outer curvature of which engages the tubular brush support 35. Spaced on either side of the central loop 44a are oppositely disposed loops 44b which interconnect the central loops 44a with side legs 44c. At the upper termination of the side legs 44c, there are hooks or locking portions 44d. In order to understand the function of the clip 44, it is necessary to consider first the cooperating structure of the wall 27. The wall 27 is formed with spaced openings 46 which extend completely through the wall 27 on either side of the channel-shaped recess 33 intermediate the ends thereof. It should be noted that the channel-shaped recess 33 and the spaced openings 46 are formed in such a way that the lower housing member 16 may be readily molded without the provision of any expensive cores and the like as would be understood by one skilled in the plastic molding art.

The clip 44 is formed with the side legs 44c angled inwardly slightly so that when the clip 44 is assembled to the lower housing member 16, there will be a biasing force urging the hooks 44d in FIG. 5 where they are locked in retaining engagement with the upper side of the wall 27. In addition, the clip 44 is dimensioned so that the side legs 44c are of such a length that force must be applied to the side loops 44b deforming the loops to cause the hooks 44d to extend far enough through the openings 46 so that they may snap into engagement with the surface or wall 47 as shown in FIG. 5. It should also be noted that the wall portions within the openings 46 are angled at 48 so as to cam the side legs 44c of the clip 44 outwardly thereby facilitating assembly of the clip 44 to the housing member 16 or more specifically to the bottom wall 27.

Thus, the spring clip 44 may be applied to the bottom wall 27 by merely inserting the side legs 44c into the spaced openings 46 and pressing firmly against the side loops 44b until the hooks 44d snap into locking engagement with the surface 47 on the upper side of the wall 27. With the clip 44 to positioned, the central loop 44a applies a retaining force against the bottom of the tubular brush support 35 seating it firmly within the channel-shaped recess 33. The wall 27 is provided with a slight bead 49 along each of the edges of the surface 47 in order that the hooks 44d may more positively lock into engagement with the wall 27. In the event that the brushes must be disassembled for replacement, it is relatively simple to insert a screwdriver between the hooks 44d and by a twisting movement of the screwdriver the hooks may be easily released from engagement with the beads 49. The above described brush structure is simple to assemble to the motor supporting frame member and requires a minimum number of parts.

While there has been shown and described a single embodiment of the present invention, it will be apparent to those skilled in the art that various changes and modifications may be made without departing from the invention in its broader aspects and it is, therefore, contemplated in the appended claims to cover all such changes and modifications as fall within the true spirit and scope of the present invention.

I claim:

1. In an electric motor including a field, a rotatable armature and a supporting frame the improvement comprising a commutator brush assembly including an elongated tubular brush support which is open at one end, a commutator brush slidably received within said support and spring biased toward said open end of said support, a channel-shaped recess formed integrally with a wall of said supporting frame and extending radially with respect to said armature, a pair of spaced openings in said wall on each side of said channel intermediate the ends thereof, said tubular brush support being received in said channel, a resilient one piece assembly clip urging said tubular support into seated position in said channel and having retaining legs extending through said openings into locking engagement with the side of said wall opposite from the side on which said channel faces, said clip comprises a W-shaped member having the curved center portion engaged with the tubular brush support and sidewardly disposed legs of said clip extending through said spaced openings, said legs having hooks on their ends to lock in engagement with the opposite side of said wall.

2. The combination of claim 1 wherein said clip is formed with a central loop the outside curvature of which engages said tubular support and a pair of oppositely disposed side loops which are interconnected to said central loop and to said legs, said loops being deformed as said hooks enter into locking engagement with said wall to apply a biasing force between said clip and said tubular support.

3. The combination of claim 2 wherein said loops are of a semicylindrical shape and said legs are parallel to each other in their assembled position, said loops being preformed so that said legs are angled toward each other whereby said hooks will snap into locking engagement with said wall when said clip is assembled thereto.

4. The combination of claim 3 wherein said spaced openings are formed with sloping cam surfaces which bias said legs outwardly as said clip is assembled to said supporting frame.

5. An electric motor comprising a field, an armature including a supporting shaft, a plastic frame member which supports said field and armature bearing means, commutator brush means supported on said frame member, said brush means including a tubular support within which a carbon brush is slidably supported for engagement with a commutator associated with said armature, said frame member having a bottom wall generally perpendicular to said shaft within which an armature bearing is mounted, a brush enclosure formed integrally with said wall and projecting outwardly from said wall toward said field to an area adjacent said commutator, an open channel-shaped recess formed in said wall and extending into said brush enclosure and extending radially with respect to said commutator, said channel-shaped recess having an open end through said brush enclosure through which said carbon brush extends into engagement with said commutator, and a spring clip having retaining legs extending through spaced openings on either side of said channel-shaped recess and biasing said tubular support into seated engagement with said wall.

6. The combination as set forth in claim 5 wherein said legs on said clip have hooks on their ends which are biased into locking engagement with complementary beads formed on said brush enclosure adjacent said spaced openings.

7. The combination of claim 6 wherein said spring clip is formed with a plurality of curved portions which interconnect said legs, one of said curved portions engaging said tubular support, deformation of said curved portions when said hooks are engaged with said beads biasing said support into said recess.